United States Patent [19]

Morino et al.

[11] Patent Number: 5,543,679
[45] Date of Patent: Aug. 6, 1996

[54] PIEZOELECTRIC-ELEMENT DRIVE APPARATUS

[75] Inventors: Seiji Morino, Okazaki; Eiji Hashimoto; Terutoshi Tomoda, both of Susono, all of Japan

[73] Assignees: Nippondenso Co., Ltd., Kariya; Toyota Jidosha Kabushiki Kaisha, Toyota, both of Japan

[21] Appl. No.: 298,553

[22] Filed: Aug. 30, 1994

[30] Foreign Application Priority Data

Aug. 31, 1993 [JP] Japan ................. 5-216149

[51] Int. Cl.$^6$ ............................... H01L 41/08
[52] U.S. Cl. ............................. 310/316; 310/317
[58] Field of Search ................... 310/316, 317

[56] References Cited

U.S. PATENT DOCUMENTS

| | | | |
|---|---|---|---|
| 4,644,212 | 2/1987 | Moritugu et al. | 310/317 |
| 4,732,129 | 3/1988 | Takigawa et al. | 310/316 X |
| 4,749,897 | 6/1988 | Natsume et al. | 310/317 |
| 4,767,959 | 8/1988 | Sakakibara et al. | 310/317 |
| 5,036,263 | 7/1991 | Yamada et al. | 318/116 |
| 5,057,734 | 10/1991 | Tsuzuki et al. | 310/317 |
| 5,204,576 | 4/1993 | Mitsuyasu | 310/317 |

FOREIGN PATENT DOCUMENTS

| | | |
|---|---|---|
| 62-17338 | 1/1987 | Japan . |
| 62-17339 | 1/1987 | Japan . |
| 62-75035 | 4/1987 | Japan . |
| 63-88247 | 4/1988 | Japan . |

*Primary Examiner*—Mark O. Budd
*Attorney, Agent, or Firm*—Cushman Darby & Cushman, L.L.P.

[57] ABSTRACT

A piezoelectric-element drive apparatus includes a direct-current power supply. An energy storing capacitor is connected in parallel with the direct-current power supply. An energy-transfer switching element becomes on when energy is transferred from the energy storing capacitor. A piezoelectric element connected in parallel with the energy storing capacitor receives energy and expands when the energy-transfer switching element becomes on. A discharging coil is connected in parallel with the piezoelectric element. A discharging switching element is operative for discharging the piezoelectric element via the discharging coil. A coupling transformer is provided between the energy storing capacitor and the piezoelectric element.

6 Claims, 10 Drawing Sheets

PIEZOLECTRIC-ELEMENT DRIVE APPARATUS

BACKGROUND OF THE INVENTION

1. Field of the Invention

This invention relates to an apparatus for driving a piezoelectric actuator in a fuel injection valve or other devices.

2. Description of the Prior Art

Some fuel injection valves for internal combustion engines include valve members driven by actuators having piezoelectric elements. In such a piezoelectric actuator, a high voltage is selectively applied to a piezoelectric element. Generally, a portion of a circuit for generating a high voltage includes a combination of a dc power source and a switching element which provides dc current pulses fed to a capacitor via an inductor to charge the capacitor.

Electric parameters, especially a capacitance, tend to vary from piezoelectric element to piezoelectric element. In addition, the electric parameters tend to vary in accordance with an ambient temperature. Accordingly, it is desirable to choose various constants of a drive circuit for a piezoelectric element in consideration of such variations in the electric parameters thereof. In cases where cylinders of an internal combustion engine are provided with respective fuel injection valves of the piezoelectric type, it is desirable to compensate for variations in the electric parameters from piezoelectric element to piezoelectric element.

Japanese published unexamined patent application 62-17338 discloses a drive circuit for electrostrictive actuators which control fuel injection valves respectively. In the drive circuit of Japanese patent application 62-17338, a switching element and inductors are used in common to the electrostrictive actuators to compensate for variations in response characteristics from actuator to actuator.

Specifically, in the drive circuit of Japanese patent application 62-17338, a first common switching element and a first common inductor are connected in series with a capacitor charged by a dc power source. The first common switching element is periodically activated so that the first common inductor derives a high voltage from a voltage across the capacitor. The high voltage is applied in common to the electrostrictive actuators to charge them. Second switching elements are connected to the electrostrictive actuators respectively while a second inductor is connected in common to the electrostrictive actuators. In more detail, opposite ends of each of the electrostrictive actuators are connected via a second switching element and the second common inductor. The second switching elements are sequentially activated so that the electrostrictive actuators will be sequentially discharged via the second common inductor.

Japanese published unexamined patent application 62-75035 discloses a drive circuit for a piezoelectric actuator which controls an engine fuel injection pump. In the drive circuit of Japanese patent application 62-75035, a voltage generated by the piezoelectric element in response to a fuel-pressure stress is used in charging a capacitor during a first period, and the voltage across the capacitor is used in charging the piezoelectric element during a second period. This process saves electric energy.

SUMMARY OF THE INVENTION

It is an object of this invention to provide an improved piezoelectric-element drive apparatus.

A first aspect of this invention provides a piezoelectric-element drive apparatus comprising a direct-current power supply; an energy storing capacitor connected in parallel with the direct-current power supply; an energy-transfer switching element which becomes on when energy is transferred from the energy storing capacitor; a piezoelectric element connected in parallel with the energy storing capacitor, and receiving energy and expanding when the energy-transfer switching element becomes on; a discharging coil connected in parallel with the pie. zoelectric element; a discharging switching element for discharging the piezoelectric element via the discharging coil; and a coupling transformer provided between the energy storing capacitor and the piezoelectric element.

It is preferable that there is further provided a clamping diode connected in parallel with the energy storing capacitor for preventing a voltage at a positive end of the energy storing capacitor from going negative.

It is preferable that a capacitor "Cs" of tile energy storing capacitor, a minimum value "Cpmin" of a capacitance of the piezoelectric element which occurs in a predetermined temperature range, and a ratio "1:n" between the number of turns of a primary winding and the number of turns of a secondary winding of the coupling transformer have a predetermined relation given as:

$$Cs/n^2 \leq Cpmin$$

The discharging coil may be replaced by an energy recovering transformer having a primary winding connected in parallel with the piezoelectric element and a secondary winding, and there may be further provided an energy recovering capacitor connected in parallel with the secondary winding of the energy recovering transformer, and a transfer circuit for transferring energy from the energy recovering capacitor to the energy storing capacitor.

It is preferable that a capacitor "Cr" of the energy recovering capacitor, a maximum value "Cpmax" of a capacitance of the piezoelectric element which occurs in a predetermined temperature range, and a ratio "m:1" between the number of turns of the primary winding and the number of turns of the secondary winding of the energy recovering transformer have a predetermined relation given as:

$$Cr/m^2 \geq Cpmax$$

A second aspect of this invention provides a piezoelectric-element drive apparatus comprising a plurality of piezoelectric-element discharging circuits each including a piezoelectric element being an actuator for opening and closing a fuel injection valve, a discharging coil connected in parallel with the piezoelectric element, and a discharging switching element for discharging the piezoelectric element via the discharging coil; a direct-current power supply; an energy storing capacitor connected in parallel with the direct-current power supply and the piezoelectric elements; an energy-transfer switching element which becomes on when energy is transferred from the energy storing capacitor to the piezoelectric elements; the piezoelectric-element discharging circuits having voltage input portions respectively; and a coupling transformer provided between the energy storing capacitor and the voltage input portions, the coupling transformer having a primary winding connected to the energy-transfer switching element and a secondary winding connected to the voltage input portions.

A third aspect of this invention provides an apparatus for driving a piezoelectric actuator having a piezoelectric member which comprises a capacitor; first means for charging the capacitor; second means for drawing electric energy from the capacitor and charging the piezoelectric member with the electric energy drawn from the capacitor; and third means for discharging the piezoelectric member; wherein the second means includes a transformer having a primary winding connected to the capacitor and a secondary winding connected to the piezoelectric member.

It is preferable that the third means includes means for transferring electric energy from the piezoelectric element to the capacitor.

DESCRIPTION OF THE PREFERRED EMBODIMENTS

First Embodiment

Figure 1:
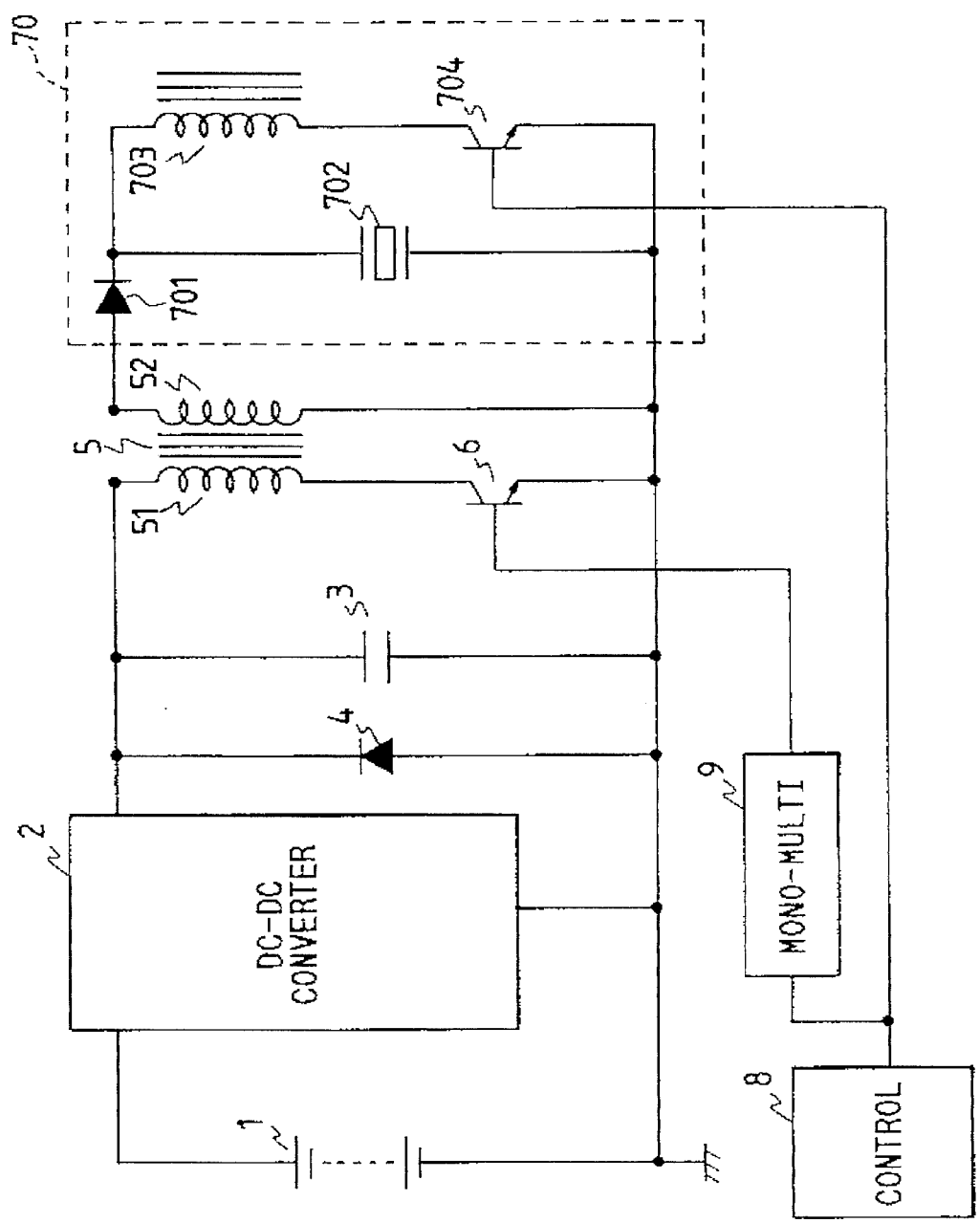
FIG. 1 is a diagram of a piezoelectric-element drive apparatus according to a first embodiment of this invention.

With reference to FIG. 1, a piezoelectric-element drive apparatus includes a vehicle battery 1 which is connected to an input side of a DC—DC converter 2. First and second ends of an energy storing capacitor 3 are connected to positive and negative output terminals of the DC—DC converter 2 respectively. The DC—DC converter 2 derives an increased voltage from the voltage across the battery 1. The energy storing capacitor 3 is charged by the output voltage from the DC—DC converter 2.

The cathode of a clamping diode 4 is connected to a junction between the positive output terminal of the DC—DC converter 2 and the first end of the capacitor 3. The anode of the clamping diode 4 is connected to a junction between the negative output terminal of the DC—DC converter 2 and the second end of the capacitor 3. The clamping diode 4 prevents the voltage at the first end of the capacitor 3 (that is, the voltage at the positive end of the capacitor 3) from going negative.

A coupling transformer 5 has a primary winding 51 and a secondary winding 52. One end of the primary winding 51 is connected to the first end of the capacitor 3, that is, the positive end of the capacitor 3. The other end of the primary winding 51 is connected to the collector of a switching transistor 6. The emitter of the switching transistor 6 is connected to the second end of the capacitor 3, that is, the negative end of the capacitor 3. The secondary winding 52 is connected to a drive circuit 70 for a piezoelectric element 702 which forms an electrical-to-mechanical converting power source of a piezoelectric actuator.

The negative terminal of the vehicle battery 1, the negative input terminal and the negative output terminal of the DC—DC converter 2, the anode of the clamping diode 4. the second end of the capacitor 3, and the emitter of the switching transistor 6 are grounded.

The drive circuit 70 includes a reverse-current blocking diode 701, a discharging coil or inductor 703, and a switching transistor 704. One end of the secondary winding 52 of the coupling transformer 5 is connected to the anode of the reverse-current blocking diode 701. The other end of the secondary winding 52 is grounded. The cathode of the reverse-current blocking diode 701 is connected to one end of the piezoelectric element 702 and one end of the discharging coil 703. The other end of the piezoelectric element 702 is connected to the other end of the secondary winding 52. The other end of the discharging coil 703 is connected to the collector of the switching transistor 704. The emitter of the switching transistor 704 is connected to the other end of the secondary winding 52.

The base of the switching transistor 704 is connected to an output terminal of a controller 8. The base of the switching transistor 6 is connected to the output terminal of a monostable multivibrator 9. The input terminal of the monostable multivibrator 9 is connected to the output terminal of the controller 8.

The piezoelectric element 702 contracts and expands in response to the voltage applied thereto, that is, in response to whether the piezoelectric element 702 is charged or discharged. The piezoelectric actuator including the piezoelectric element 702 is designed to drive the valve member of a fuel injection valve (not shown). The fuel injection valve is opened and closed-when the piezoelectric element 702 contracts and expands respectively. Accordingly, fuel injection through the fuel injection valve is enabled and inhibited when the piezoelectric element 702 contracts and expands respectively.

Figure 2:
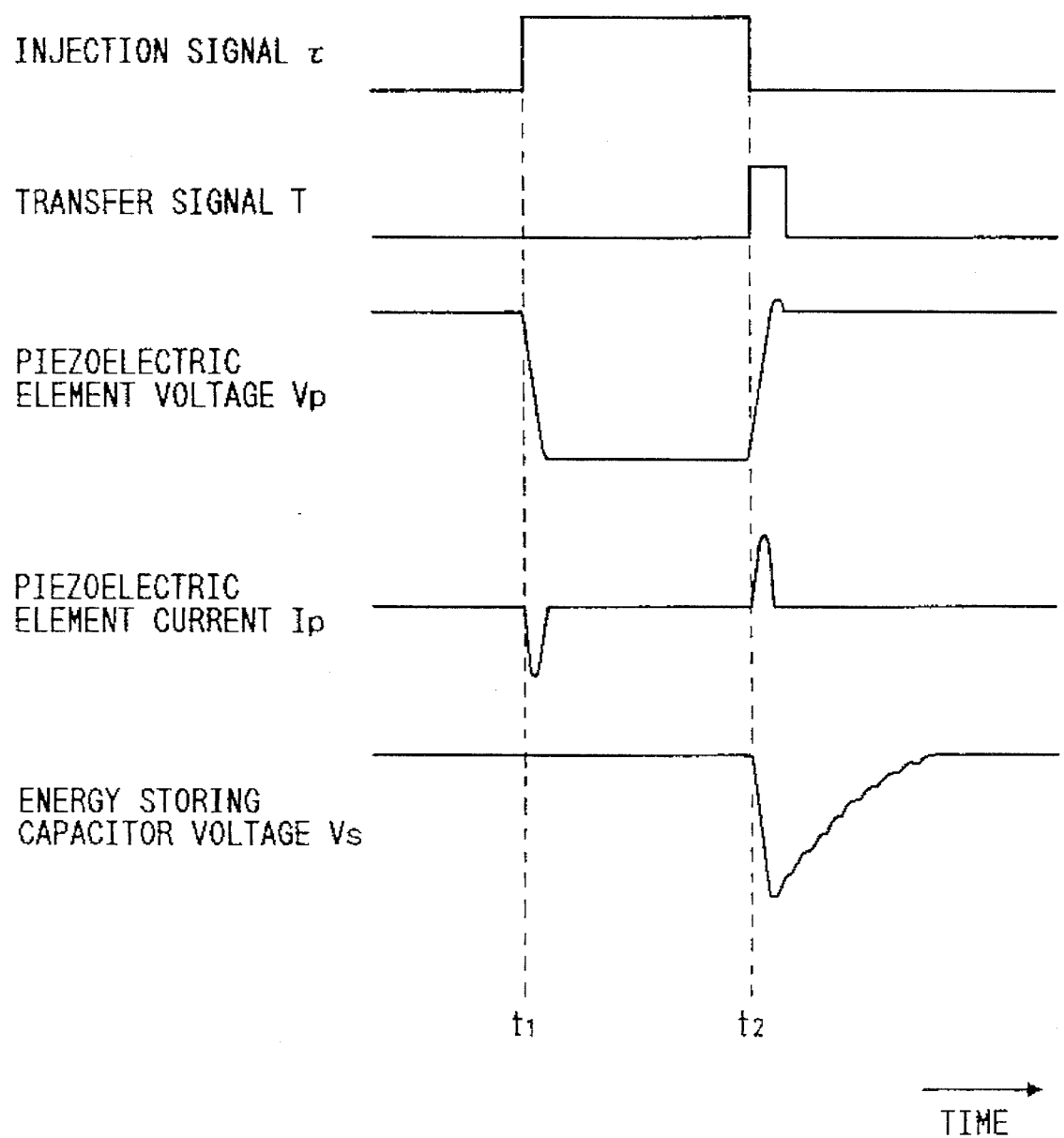
FIG. 2 is a time-domain diagram of signals, voltages, and a current in the apparatus of FIG. 1.

Operation of the piezoelectric-element drive apparatus of FIG. 1 will now be described with reference to FIG. 2. The controller 8 outputs a fuel injection pulse signal "τ" to the monostable multivibrator 9 and the base of the switching transistor 704. In FIG. 2, the fuel injection pulse signal "τ" is in a high-level state during an interval between moments t1 and t2, and is in a low-level state during other intervals.

At the moment t1, the fuel injection pulse signal "τ" assumes the high-level state so that the switching transistor 704 changes to an on state (the collector-emitter path of the switching transistor 704 goes conductive). As a result, an electric energy is removed from the piezoelectric element 702 via the discharging coil 703, and the voltage Vp across the piezoelectric element 702 drops to the ground potential. At the same time, a discharging current Ip flows from the piezoelectric element 702. The drop in the voltage Vp causes contraction of the piezoelectric element 702, opening the fuel injection valve and starting fuel injection therethrough.

The voltage Vp across the piezoelectric element 703 remains at the ground potential and the fuel injection continues until the subsequent moment t2.

At the moment t2, the fuel injection pulse signal "τ" returns to the low-level state so that the switching transistor 704 changes to an off state (the collector-emitter path of the switching transistor 704 goes non-conductive). An output signal "T" from the monostable multivibrator 9 changes to a high-level state in response to the high-to-low change in the fuel injection pulse signal "τ". The base of the switching transistor 6 is subjected to the output signal "T" from the monostable multivibrator 9. When the output signal "T" from the monostable multivibrator 9 assumes the high-level state, the switching transistor 6 changes to an on state (the collector-emitter path of the switching transistor 6 goes conductive). As a result, an electric energy is transferred from the capacitor 3 to the piezoelectric element 702 via the coupling transformer 5, and the piezoelectric element 702 is charged thereby and the voltage Vp across the piezoelectric element 702 returns to a high level. At the same time, a charging current Ip flows into the piezoelectric element 702. The return of the voltage Vp to the high level causes expansion of the piezoelectric element 702, closing the fuel injection valve and terminating the fuel injection therethrough.

The output signal "T" from the monostable multivibrator 9 remains in the high-level state for a predetermined interval. The transfer of electric energy from the capacitor 3 to the piezoelectric element 702 continues while the output signal "T" from the monostable multivibrator 9 remains in the high-level state. As the transfer of electric energy from the capacitor 3 to the piezoelectric element 702 advances, the voltage Vs across the capacitor 3 drops.

When the predetermined interval has elapsed from the moment t2, the output signal "T" from the monostable multivibrator 9 returns to the low-level state. As a result of the return of the signal "T" to the low-level state, the switching transistor 6 changes to an off state (the collector-emitter path of the switching transistor 6 goes non-conductive). Therefore, the transfer of electric energy from the capacitor 3 to the piezoelectric element 702 is interrupted while the voltage Vs across the capacitor 3 is recovered by a charging current fed from the DC—DC converter 2.

Figure 3:
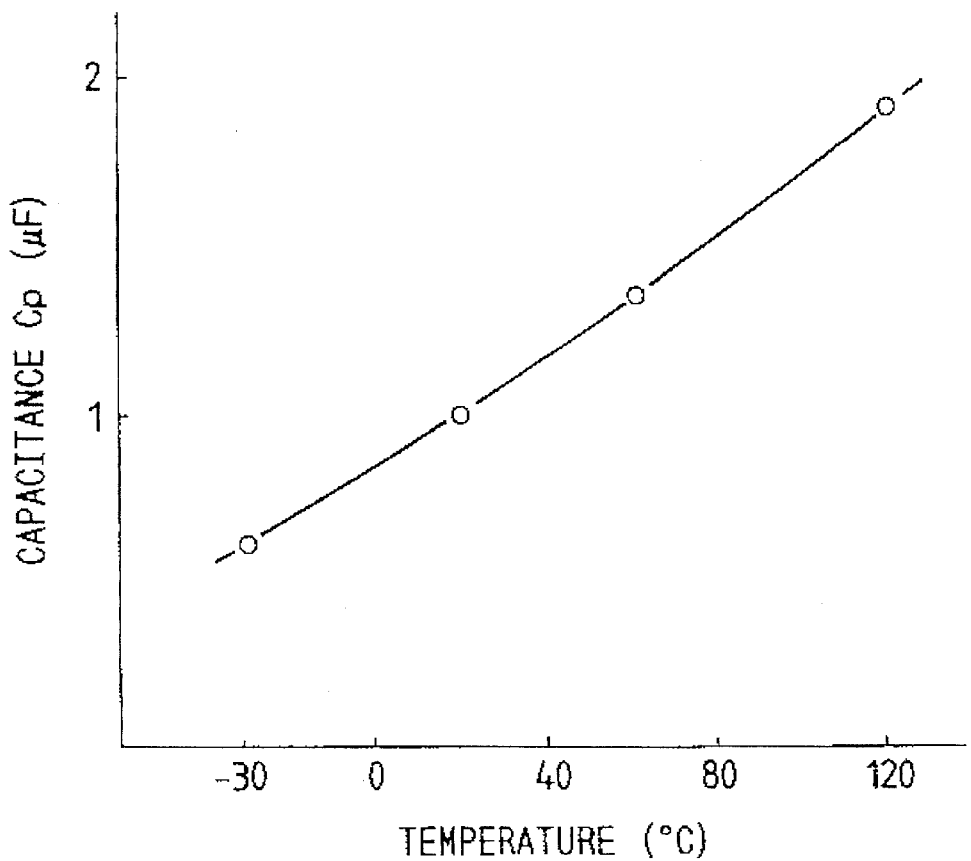
FIG. 3 is a diagram of the relation between the capacitance of a piezoelectric element and am ambient temperature.

FIG. 3 shows an example of the relation between the capacitance of the piezoelectric element 702 and an ambient temperature. As shown in FIG. 3, the capacitance of the piezoelectric element 702 increases approximately linearly with the ambient temperature. The capacitance of the piezoelectric element 702 is about 0.6 μF and 1.8 μF when the ambient temperature is −30° C. and 120° C. respectively. Accordingly, to compensate for such a temperature-dependent variation in the capacitance of the piezoelectric element 702 regarding drive and control of the fuel injection valve, it is preferable to transfer a given amount of charges or more from the capacitor 3 to the piezoelectric element 702 during a single transfer interval (corresponding to the predetermined interval for which the output signal "T" from the monostable multivibrator 9 remains in the high-level state).

Figure 4:
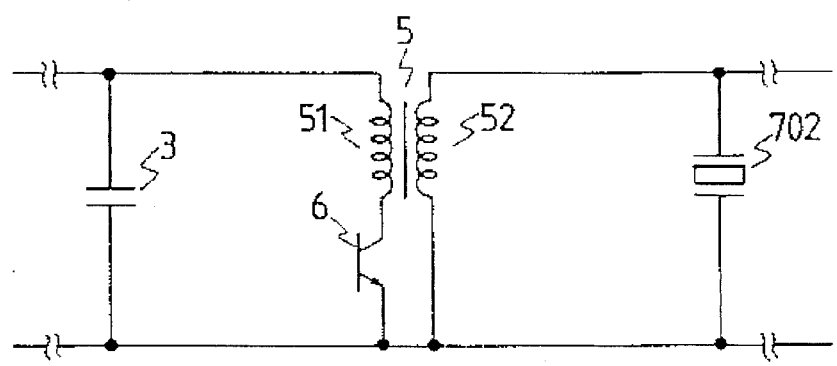
FIG. 4 is a schematic diagram of a portion of FIG. 1 in which a reverse-current blocking diode is short-circuited or omitted for convenience.

This compensation will now be described in detail with reference to FIGS. 4 and 5. The leakage inductance L1 of the coupling transformer 5 is expressed as follows.

$$Ll = 2 \times (1-k) \times n^2 \times L1 \quad (1)$$

where "k" denotes a coupling coefficient of the transformer 5; "n" denotes the turn ratio of the transformer 5 (the ratio of the number of turns in the secondary winding 52 to the number of turns in the primary winding 51 of the transformer 5); and L1 denotes the inductance of the primary winding 51 of the transformer 5. It should be noted that a current flowing into the exciting inductance of the coupling transformer 5 is negligible and therefore the equation (1) is accurate and valid when the following relation is satisfied.

$$k \gg (1-k)$$

This relation means that the value "k" is sufficiently greater than the value "(1−k)". In fact, the coupling transformer 5 is designed to satisfy this relation.

Figure 5:
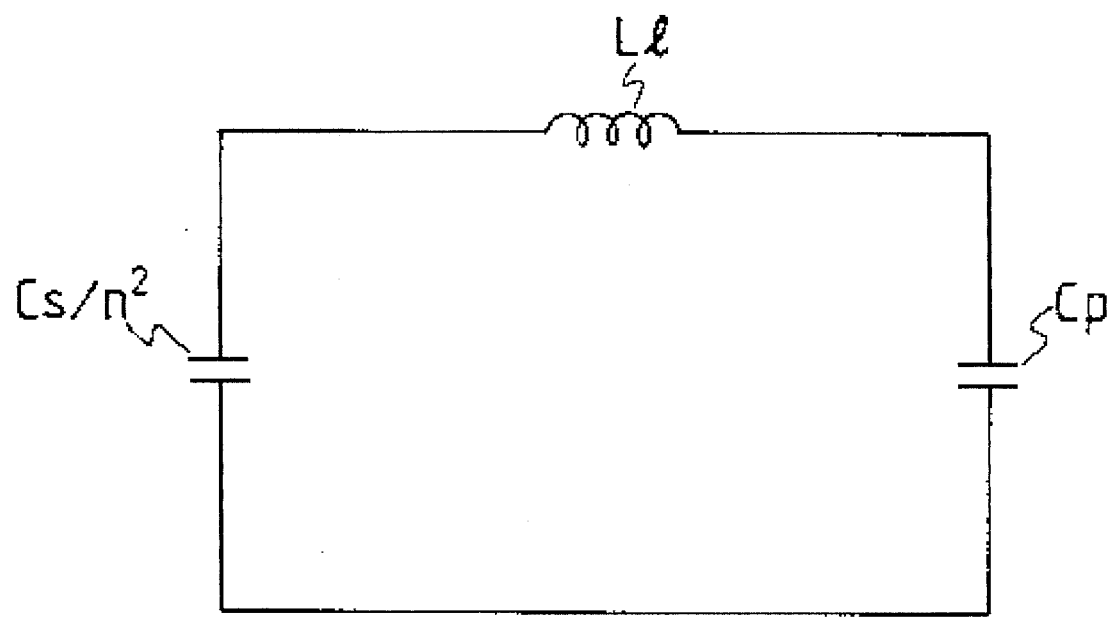
FIG. 5 is a schematic diagram of an equivalent circuit with respect to the circuit of FIG. 4.

As shown in FIG. 5, an equivalent capacitor with respect to the energy storing capacitor 3 has a capacitance "Cs/n²" where Cs denotes the capacitance of the capacitor 3. In FIG. 5, the capacitance of the piezoelectric element 702 is denoted by the character "Cp".

Figure 6:
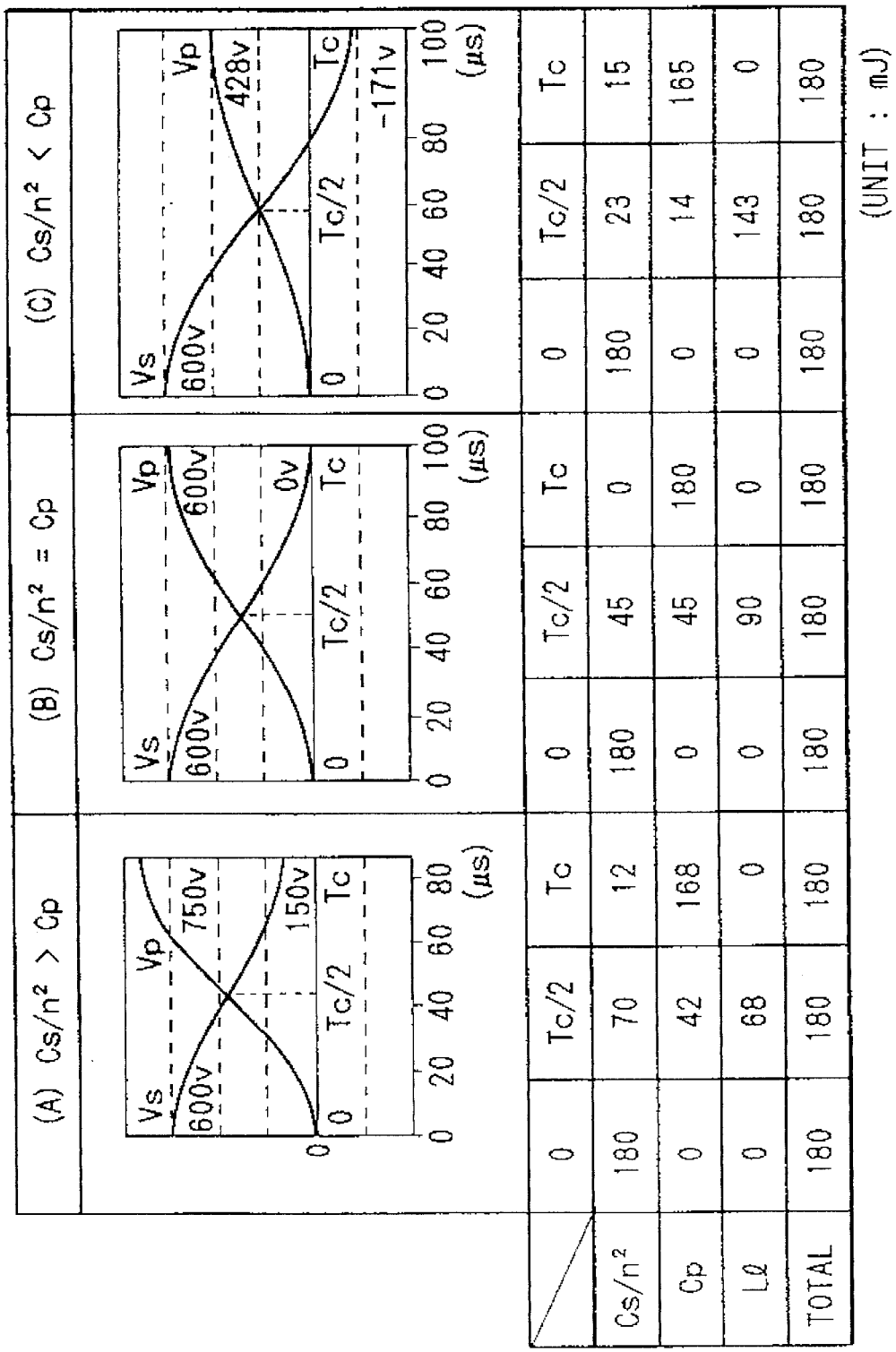
FIG. 6 is a diagram of time-domain variations in voltages and energies stored in circuit elements of FIG. 5.

FIG. 6 shows time-domain variations in the voltage Vs across an equivalent capacitor with respect to the energy storing capacitor 3 and the voltage Vp across the capacitor of the piezoelectric element 702 which occur under conditions where L1=2 mH; n²=10; Cs=10 μF; and k=0.95. The section (A) of FIG. 6 shows time-domain variations which occur in the case where Cs/n²>Cp (for example, in the case where the ambient temperature is −30° C.). The section (B) of FIG. 6 shows time-domain variations which occur in the case where Cs/n²=Cp (for example, in the case where the ambient temperature is 20° C.). The section (C) of FIG. 6 shows time-domain variations which occur in the case where Cs/n²<Cp (for example, in the case where the ambient temperature is 120° C.).

The lower half of FIG. 6 indicates the values of electric energies stored in the equivalent capacitor (Cs/n²) with respect to the energy storing capacitor 3, the capacitor (Cp) of the piezoelectric element 702, and the leakage inductance L1 at moments "0", "Tc/2", and "Tc". The values of electric energies are expressed in unit of mJ. The interval between the moments "0" and "Tc" is referred to as a charging time "Tc".

In the case where the ambient temperature is about 20° C., the relation as Cs/n²=Cp=1 μF is satisfied. Accordingly, in this case, an electric energy of 180 mJ, which has been stored in the equivalent capacitor (Cs/n²) with respect to the energy storing capacitor 3 at the moment "0", can be fully transferred to the piezoelectric element 702 at the moment "Tc".

On the other hand, in the case where the ambient temperature is relatively high or relatively low, some of electric energy remains in the equivalent capacitor (Cs/n²) with respect to the energy storing capacitor 3 at the moment "Tc".

In the case where the ambient temperature is relatively high, the potential at the first end (the positive end) of the energy storing capacitor 3 would go negative after an electric energy has been transferred therefrom. In fact, the clamping diode 4 connected in parallel with the energy storing capacitor 3 prevents the potential at the first end (the positive end) of the capacitor 3 from going negative.

In the presence of the clamping diode 4, an electric energy can be fully transferred from the energy storing capacitor 3 to the piezoelectric element 702 even at an increased ambient temperature provided that the turn ratio "n" of the coupling transformer 5 is chosen to satisfy the following relation.

$$Cs/n^2 \leq Cpmin$$

where "Cpmin" denotes the minimum capacitance of the piezoelectric element 702 which occurs in a predetermined temperature range where the piezoelectric element 702 is actually used.

As the turn ratio "n" of the coupling transformer 5 is further increased, a current flowing into the primary winding 51 of the transformer 5 increases. Thus, it is disadvantageous to excessively increase the turn ratio "n" of the coupling transformer 5.

Accordingly, the optimal value "nopt" of the turn ratio "n" of the coupling transformer 5 is given by the following equation.

$$nopt = \sqrt{Cs/Cpmin} \qquad (2)$$

As previously described, the capacitance of the piezoelectric element 702 is equal to 0.6 µF at an ambient temperature of −30° C. When the minimum capacitance "Cpmin" of the piezoelectric element 702 is set to 0.6 µF and the capacitance "Cs" of the energy storing capacitor 3 is set to 10 µF, the optimal value "nopt" of the turn ratio "n" of the coupling transformer 5 is approximately equal to 4. In this case, the charging time "Tc" is given by the following equation.

$$Tc = \pi \sqrt{L1 \left\{ \frac{1}{Cs/n^2} + \frac{1}{Cpmin} \right\}} \qquad (3)$$

When the charging time "Tc" is set to a given value, the inductance L1 of the primary winding 51 of the coupling transformer 5 is determined by referring to the previously-indicated equations (1) and (3).

Second Embodiment

Figure 7:
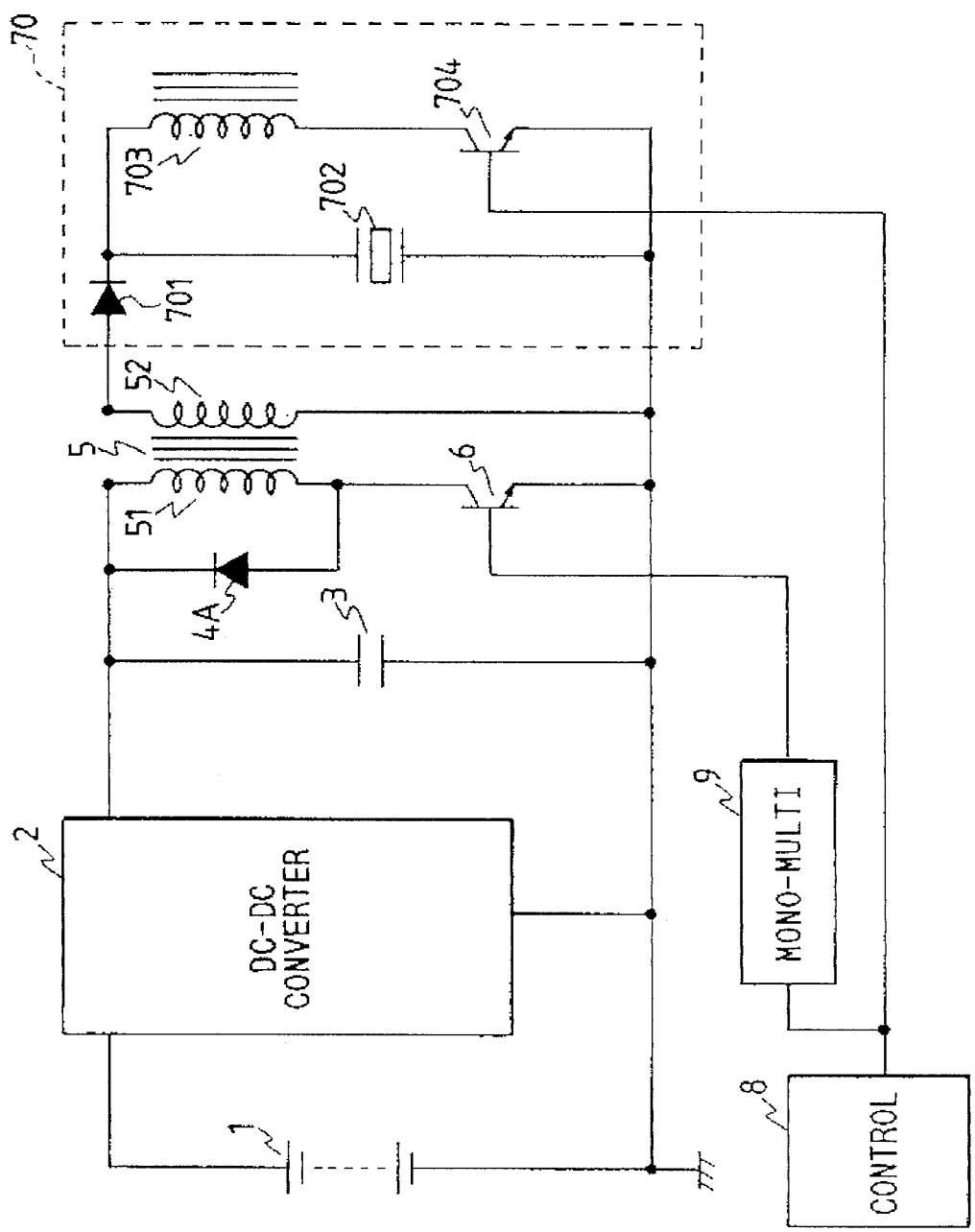
FIG. 7 is a diagram of a piezoelectric-element drive apparatus according to a second embodiment of this invention.

FIG. 7 shows a second embodiment of this invention which is similar to the embodiment of FIGS. 1–6 except for the position of a clamping diode. Specifically, in the embodiment of FIG. 7, a clamping diode 4A is connected in parallel with a primary winding 51 of a coupling transformer 5. The cathode of the clamping diode A is connected to a junction between ends of the primary winding 51 and an energy storing capacitor 3. The anode of the clamping diode 4A is connected to a junction between the other end of the primary winding 51 and tile collector of a switching transistor 6.

Third Embodiment

Figure 8:
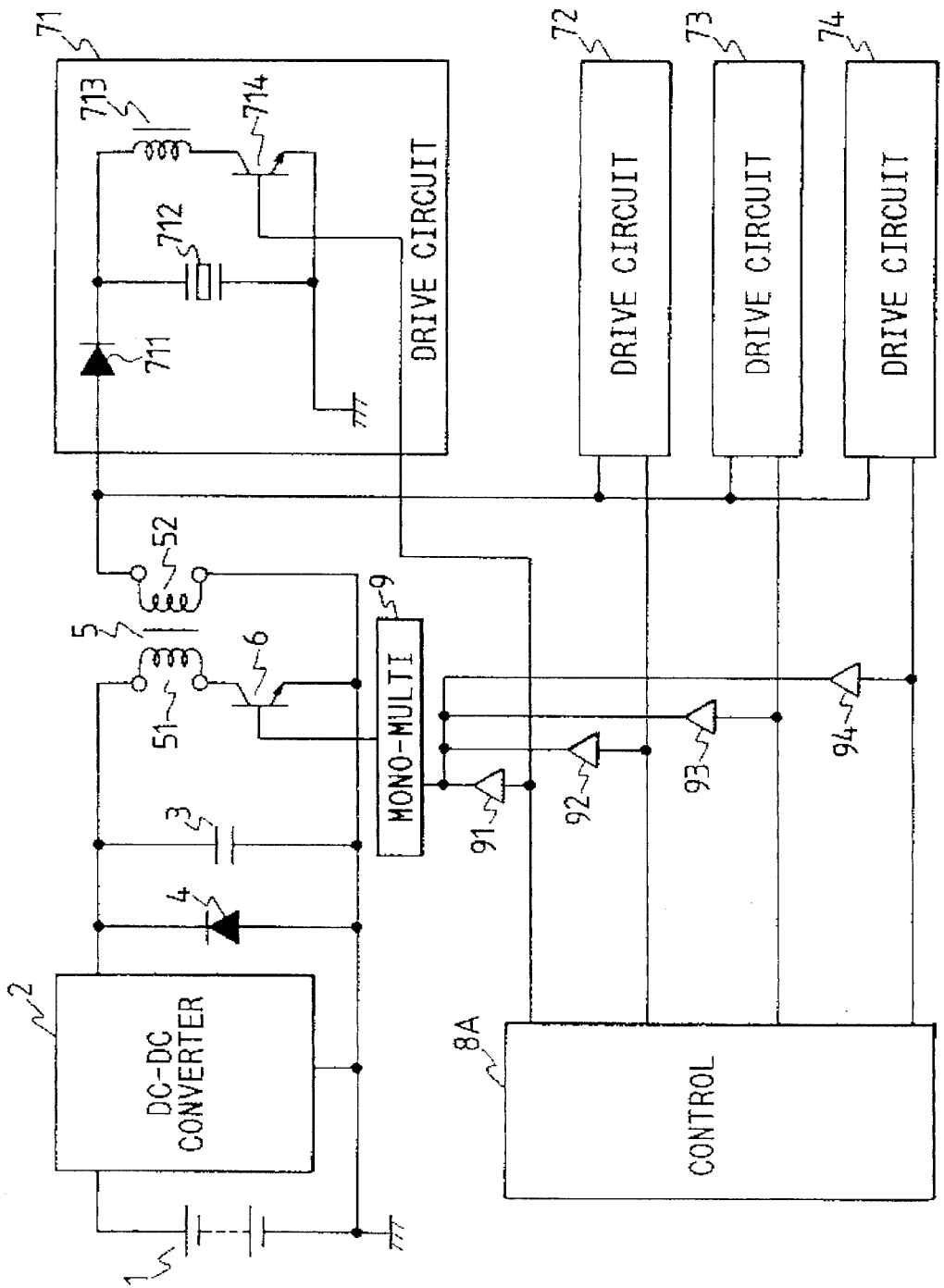
FIG. 8 is a diagram of a piezoelectric-element drive apparatus according to a third embodiment of this invention.

FIG. 8 shows a third embodiment of this invention which is similar to the embodiment of FIGS. 1–6 except for an additional design indicated hereinafter.

The embodiment of FIG. 8 is designed for an internal combustion engine having four cylinders #1, #2, #3, and #4 and four fuel injection valves assigned to the respective cylinders #1, #2, #3, and #4. The embodiment of FIG. 8 includes drive circuits 71, 72, 73, and 74 for piezoelectric elements in piezoelectric actuators which drive and control the fuel injection valves respectively.

In the embodiment 8, a vehicle battery 1, a DC—DC converter 2, an energy storing capacitor 3, a clamping diode 4, a coupling transformer 5, a switching transistor 6, a controller 8A, and a monostable multivibrator 9 are used in common to the four cylinders #1, #2, #3, and #4. On the other hand, the drive circuits 71, 72, 73, and 74 are used for the cylinders #1, #2, #3, and #4 respectively.

The structures of the drive circuits 71, 72, 73, and 74 are similar to the structure of the drive circuit 70 of FIG. 1. Only the structure of the drive circuit 71 will be described below in detail.

The drive circuit 71 includes a reverse-current blocking diode 711, a discharging coil or inductor 713, and a switching transistor 714. One end of a secondary winding 52 of the coupling transformer 5 is connected to the anode of the reverse-current blocking diode 711. The other end of the secondary winding 52 is grounded. The cathode of the reverse-current blocking diode 711 is connected to one end of a piezoelectric element 712 and one end of the discharging coil 713. The other end of the piezoelectric element 712 is grounded. The other end of the discharging coil 713 is connected to the collector of the switching transistor 714. The emitter of the switching transistor 714 is grounded. The base of the switching transistor 714 is connected to a first output terminal of the controller 8A.

The drive circuits 72, 73, and 74 include reverse-current blocking diodes whose anodes are connected in common to one end of the secondary winding 52 of the coupling transformer 5. The drive circuits 72, 73, and 74 also include switching transistors whose bases are connected to second, third, and fourth output terminals of the controller 8A respectively.

The first, second, third. and fourth output terminals of the controller 8A are connected to the input terminal of the monostable multivibrator 9 via buffers 91, 92, 93, and 94 respectively.

Figure 9:
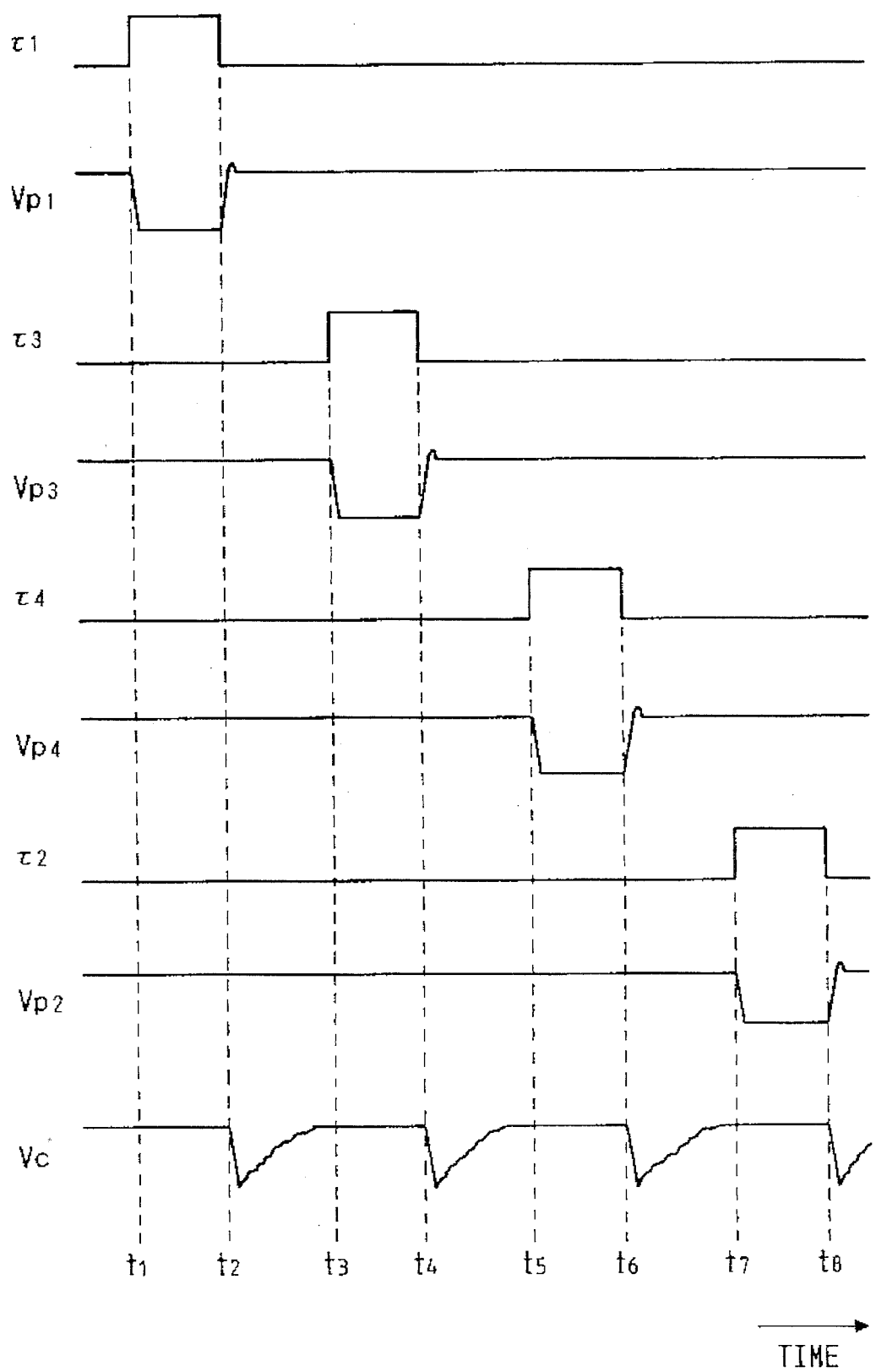
FIG. 9 is a time-domain diagram Of signals and voltages in the apparatus of FIG. 8.

Operation of the embodiment of FIG. 8 will now be described with reference to FIG. 9 in which moments t1, t2, t3, t4, t5, t6, t7, and t8 are arranged in the order along the time base. The controller 8A outputs a fuel injection pulse signal "τ1" to the base of the switching transistor within the drive circuit 71, and also outputs it to the monostable multivibrator 9 via the buffer 91. In FIG. 9, the fuel injection pulse signal "τ1" is in a high-level state during the interval between the moments t1 and t2, and is in a low-level state during other intervals. The controller 8A outputs a fuel injection pulse signal "τ3" to the base of the switching transistor within the drive circuit 73, and also outputs it to the monostable multivibrator 9 via the buffer 93. In FIG. 9, the fuel injection pulse signal "τ3" is in a high-level state during the interval between the moments t3 and t4, and is in a low-level state during other intervals. The controller 8A outputs a fuel injection pulse signal "x4" to the base of the switching transistor within the drive circuit. 74, and also outputs it to the monostable multivibrator 9 via the buffer 94. In FIG. 9, the fuel injection pulse signal "τ4" is in a high-level state during the interval between the moments t5 and t6, and is in a low-level state during other intervals. The controller 8A outputs a fuel injection pulse signal "τ2" to the base of the switching transistor within the drive circuit 72, and also outputs it to the monostable multivibrator 9 via the buffer 92. In FIG. 9, the fuel injection pulse signal "t2" is in a high-level state during the interval between the moments t7 and t8, and is in a low-level state during other intervals.

At the moment t1, the voltage Vp1 across the piezoelectric element corresponding to the engine cylinder #1 drops from a high potential to the ground potential. At the subsequent moment t2, the voltage Vpl across the piezoelectric element corresponding to the engine cylinder #1 returns from the ground potential to the high potential. During a predetermined interval from the moment t2 which is determined by the monostable multivibrator 9, the voltage Vc across the energy storing capacitor 3 drops from a fully charged level. After the predetermined interval but before the moment t3, the voltage Vc across the energy storing capacitor 3 is recovered.

At the moment t3. the voltage Vp3 across the piezoelectric element corresponding to the engine cylinder #3 drops from a high potential to the ground potential. At the subsequent moment t4, the voltage Vp3 across the piezoelectric element corresponding to the engine cylinder #3 returns from the ground potential to the high potential. During a predetermined interval from the moment t4 which is determined by the monostable multivibrator 9, the voltage Vc across the energy storing capacitor 3 drops from the fully charged level. After the predetermined interval but before the moment t5, the voltage Vc across the energy storing capacitor 3 is recovered.

At the moment t5. the voltage Vp4 across the piezoelectric element corresponding to the engine cylinder #4 drops from a high potential to the ground potential. At the subsequent moment t6, the voltage Vp4 across the piezoelectric element corresponding to the engine cylinder #4 returns from the ground potential to the high potential. During a predetermined interval from the moment t6 which is determined by the monostable multivibrator 9, the voltage Vc across the energy storing capacitor 3 drops from the fully charged level. After the predetermined interval but before the moment t7, the voltage Vc across the energy storing capacitor 3 is recovered.

At the moment t7, the voltage Vp2 across the piezoelectric element corresponding to the engine cylinder #2 drops from a high potential to the ground potential. At the subsequent moment t8, the voltage Vp2 across the piezoelectric element corresponding to the engine cylinder #2 returns from the ground potential to the high potential. During a predetermined interval from the moment t8 which is determined by the monostable multivibrator 9, the voltage Vc across the energy storing capacitor 3 drops from the fully charged level. After the predetermined interval, the voltage Vc across the energy storing capacitor 3 is recovered.

As understood from the previous description, the engine cylinders #1, #3, #4, and #2 are sequentially subjected to fuel injection in response to the sequential application and removal of the high potentials to and from the piezoelectric elements.

It should be noted that the clamping diode 4 may be connected in parallel with a primary winding 51 of the coupling transformer 5 as in the embodiment of FIG. 7.

FOURTH EMBODIMENT

Figure 10:
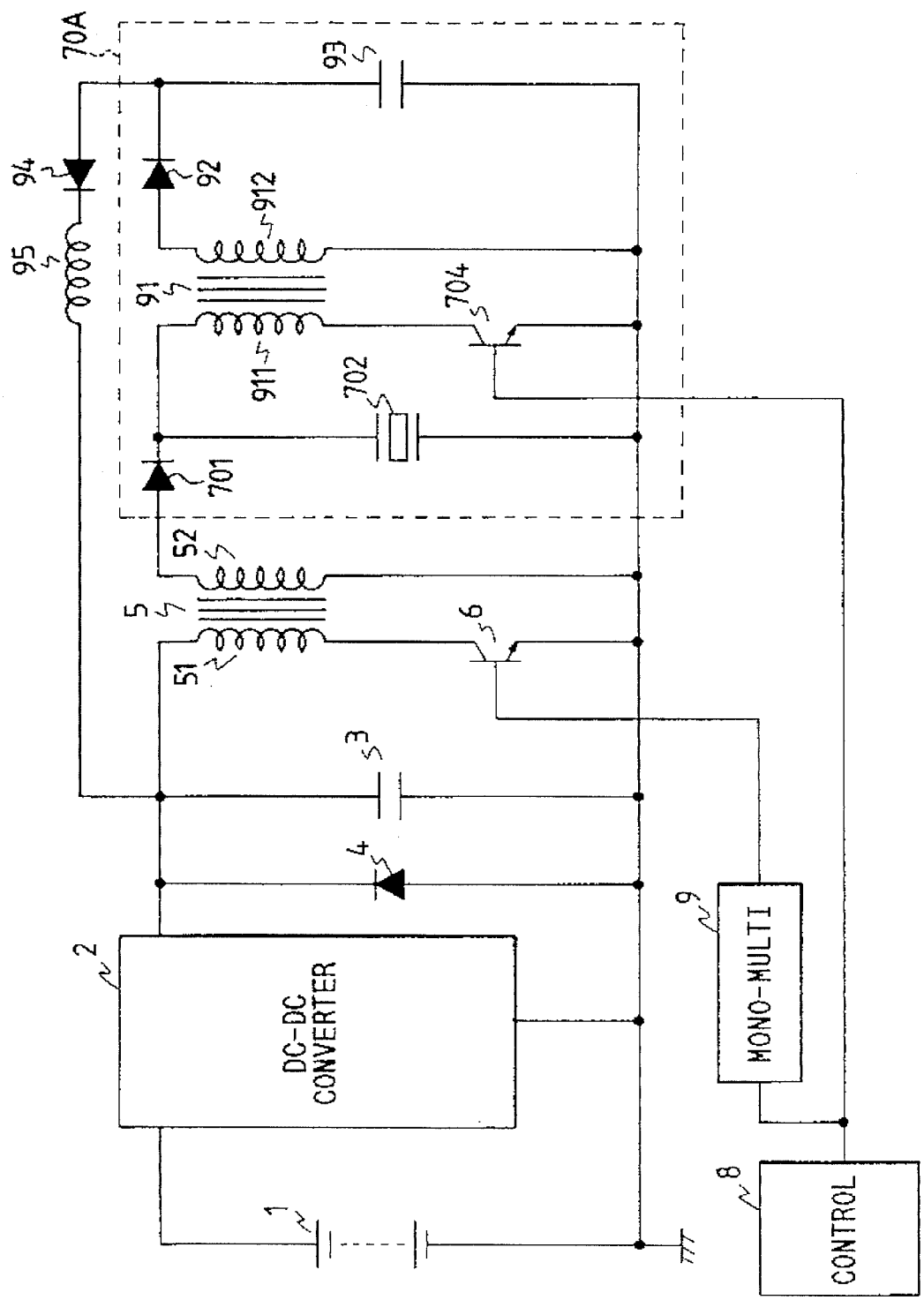
FIG. 10 is a diagram of a piezoelectric-element drive apparatus according to a fourth embodiment of this invention.

FIG. 10 shows a fourth embodiment of this invention which is similar to the embodiment of FIGS. 1–6 except for design changes indicated hereinafter.

The embodiment of FIG. 10 uses a drive circuit 70A in place of the drive circuit 70 of FIG. 1. The embodiment of FIG. 10 includes a reverse-current blocking diode 94 and an energy recovering coil or inductor 95.

The drive circuit 70A includes a reverse-current blocking diode 701. a switching transistor 704, an energy recovering transformer 91, a reverse-current blocking diode 92, and an energy recovering capacitor 93. One end of a secondary winding 52 of a coupling transformer 5 is connected to the anode of the reverse-current blocking diode 701. The other end of the secondary winding 52 of the coupling transformer 5 is grounded. The cathode of the reverse-current blocking diode 701 is connected to one end of a piezoelectric element 702 and one end of a primary winding 911 of the energy recovering transformer 91. The other end of the piezoelectric element 702 is connected to the other end of the secondary, winding 52 of the coupling transformer 52. The other end of the primary winding 911 of the energy recovering transformer 91 is connected to the collector of the switching transistor 704. The emitter of the switching transistor 704 is connected to the other end of the secondary winding 52 of the coupling transformer 5. The base of the switching transistor 704 is connected to an output terminal of a controller 8. One of a secondary winding 912 of the energy recovering transformer 91 is connected to the anode of the reverse-current blocking diode 92. The other end of the secondary winding 912 of the energy recovering transformer 91 is connected to the other end of the secondary winding 52 of the coupling transformer 5. The cathode of the reverse-current blocking diode 92 is connected to one end of the energy recovering capacitor 93. The other end of the energy recovering capacitor 93 is connected to the other end of the secondary winding 52 of the coupling transformer 5.

The anode of the reverse-current blocking diode 94 is connected to a junction between the cathode of the reverse-current blocking diode 92 and one end of the energy recovering capacitor 93. The cathode of the reverse-current blocking diode 94 is connected via the energy recovering coil 95 to a junction between an energy storing capacitor 3 and a primary winding 51 of the coupling transformer 5.

Figure 11:
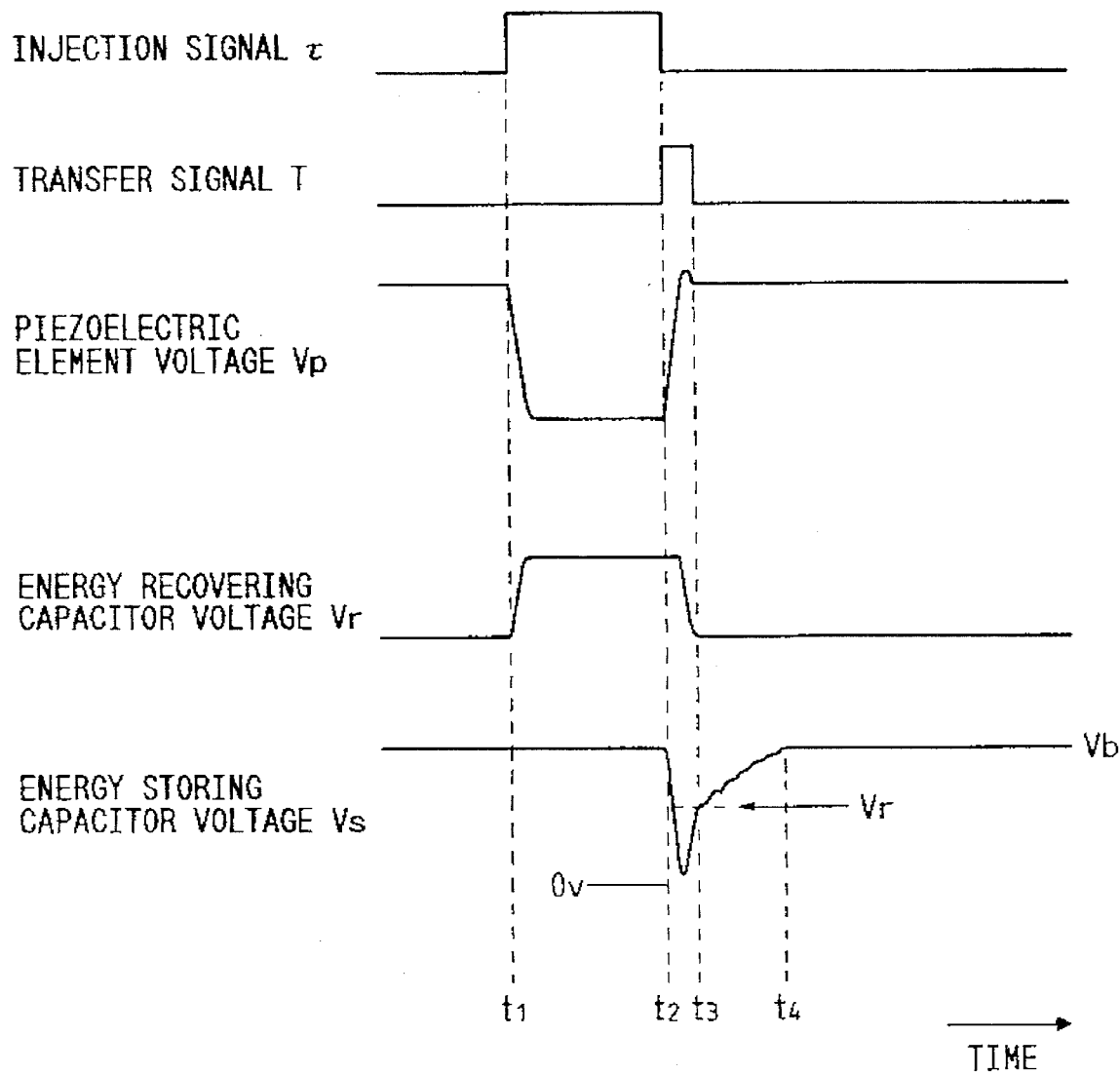
FIG. 11 is a time-domain diagram of signals and voltages in the apparatus of FIG. 10.

Operation of the embodiment of FIG. 10 will now be described with reference to FIG. 11 in which moments t1, t2, t3, and t4 are arranged in the order along the time base. The controller 8 outputs a fuel injection pulse signal "τ" to a monostable multivibrator 9 and the base of the switching transistor 704. In FIG. 11, the fuel injection pulse signal "τ" is in a high-level state during the interval between the moments t1 and t2. and is in a low-level state during other intervals.

At the moment t1, the fuel injection pulse signal "τ" assumes the high-level state so that the switching transistor 704 changes to an on state (the collector-emitter path of the switching transistor 704 goes conductive). As a result, an electric energy is removed from the piezoelectric element 702 via the discharging coil 703, and the voltage Vp across the piezoelectric element 702 drops to the ground potential. The drop in the voltage Vp causes contraction of the piezoelectric element 702, opening a fuel injection valve and starting fuel injection therethrough. At the sanhe time, the electric energy removed from the piezoelectric element 702 is stored into the energy recovering capacitor 93 via the energy recovering transformer 91 and the reverse-current blocking diode 92 so that the voltage Vr across the energy recovering capacitor 93 rises from the ground potential 1o a charged level.

The voltage Vp across the piezoelectric element 703 remains at the ground potential and the fuel injection continues until the subsequent moment t2. The voltage Vr across the energy recovering capacitor 93 remains at the charged level until a moment intermediate between the moments t2 and t3.

At the moment t2, the fuel injection pulse signal "τ" returns to the low-level state so that the switching transistor 704 changes to an off state (the collector-emitter path of the switching transistor 704 goes non-conductive). An output signal "τ" from the monostable multivibrator 9 changes to a high-level state in response to the high-to-low change in the fuel injection pulse signal "τ". The base of a switching transistor 6 is subjected to the output signal "T" from the monostable multivibrator 9. When the output signal "T" from the monostable multivibrator 9 assumes the high-level state, the switching transistor 6 changes to am on state (the collector-emitter path of the switching transistor 6 goes conductive). As a result, an electric energy is transferred from the energy storing capacitor 3 to the piezoelectric element 702 via the coupling transformer 5, and the piezoelectric element 702 is charged thereby and the voltage Vp across the piezoelectric element 702 returns to a high level. The return of the voltage Vp to the high level causes expansion of the piezoelectric element 702, closing the fuel injection valve and terminating the fuel injection therethrough.

The output signal "T" from the monostable multivibrator 9 remains in the high-level state for a predetermined interval which expires at the moment t3. The transfer of electric energy from the energy storing capacitor 3 to the piezoelectric element 702 continues while the output signal "T" from the monostable multivibrator 9 remains in the high-level state. As the transfer of electric energy from the energy storing capacitor 3 to the piezoelectric element 702 advances, the voltage Vs across the energy storing capacitor 3 drops from a fully charged level. When the voltage Vs across the energy storing capacitor 3 drops, electric energy is transferred from tile energy recovering capacitor 93 to the energy storing capacitor 3 via the reverse-current blocking diode 94 and the energy recovering coil 95. The transfer of electric energy from the energy recovering capacitor 93 to the energy storing capacitor 3 suppresses a further drop in the voltage Vs across the energy storing capacitor 3. and causes an increase in the voltage Vs. At the same time, the transfer of electric energy from the energy recovering capacitor 93 to the energy storing capacitor 3 causes a decrease in the voltage Vr across the energy recovering capacitor 93. When the voltage Vs across the energy storing capacitor 3 and the voltage Vr across the energy recovering capacitor 93 become substantially equal, the transfer of electric energy from the energy recovering capacitor 93 to the energy storing capacitor 3 terminates.

At the moment t3, the output signal "T" from the monostable multivibrator 9 returns to the low-level state. As a result of the return of the signal "T" to the low-level state, the switching transistor 6 changes to an off state (the collector-emitter path of the switching transistor 6 goes non-conductive). Therefore, the transfer of electric energy from the energy storing capacitor 3 to the piezoelectric element 702 is interrupted while the voltage Vs across the capacitor 3 is recovered by a charging current fed from the DC—DC converter 2. At the moment t4. the voltage Vs across the energy storing capacitor 3 returns to the fully charged level.

To efficiently transfer electric energy from the energy recovering capacitor 93 to the energy storing capacitor 3 at every temperature in a predetermined range, it is preferable that the turn ratio "m" of the energy recovering transformer 91 (the ratio of the number of turns in the primary winding 911 to the number of turns in the secondary winding 912 of the transformer 91) and the capacitance "Cr" of the energy recovering capacitor 93 satisfy the following relation.

$$Cr/m^2 \geq Cpmax$$  (55)

where "Cpmax" denotes the maximum capacitance of the piezoelectric element 702 which occurs in the predetermined temperature rage. In this case, a charging time "Tr" for the energy recovering capacitor 93 is given by the following equation.

$$Tr = \pi \sqrt{Lr / \left\{ \frac{1}{Cr/m^2} + \frac{1}{Cpmax} \right\}}$$  (4)

where "Lr" denotes the leakage inductance of the energy recovering transformer 91.

What is claimed is:

1. A piezoelectric-element drive apparatus comprising:

a direct-current power supply;

an energy storing capacitor connected in parallel with the direct-current power supply;

an energy-transfer switching element which becomes on when energy is transferred from the energy storing capacitor;

a piezoelectric element connected in parallel with the energy storing capacitor, and receiving energy and expanding when the energy-transfer switching element becomes on;

a discharging coil connected in parallel with the piezoelectric element;

a discharging switching element for discharging the piezoelectric element via the energy recovery transformer;

a coupling transformer provided between the energy storing capacitor and the piezoelectric element;

wherein a capacitor "Cs" of the energy storing capacitor, a minimum value "Cpmin" of a capacitance of the piezoelectric element which occurs in a predetermined temperature range, and a ratio "1:n" between the number of turns of a primary winding and the number of turns of a secondary winding of the coupling transformer have a predetermined relation given as:

$$Cs/n^2 \leq Cpmin.$$

2. A piezoelectric-element drive apparatus comprising:

a direct-current power supply;

an energy storing capacitor connected in parallel with the direct-current power supply;

an energy-transfer switching element which becomes on when energy is transferred from the energy storing capacitor;

a piezoelectric element connected in parallel with the energy storing capacitor, and receiving energy and expanding when the energy-transfer switching element becomes on;

an energy recovering transformer having a primary winding and a secondary winding, the primary winding being connected in parallel with the piezoelectric element;

a discharging switching element for discharging the piezoelectric via the discharging coil; and a coupling transformer provided between the energy storing capacitor and the piezoelectric element;

an energy recording capacitor connected in parallel with the secondary winding of the energy recovering transformer; and a transfer circuit for transferring energy from the energy recovering capacitor to the energy storing capacitor, wherein a capacitor "Cr" of the energy recovering capacitor, a maximum value "Cpmax" of a capacitance of the piezoelectric element which occurs in a predetermined temperature range, and a ratio "m:1" between the number of turns of the primary winding and the number of turns of the secondary winding of the energy recovering transformer have a predetermined relation given as:

$$Cr/m^2 \geq Cpmax.$$

3. An apparatus for driving a piezoelectric actuator having a piezoelectric member, comprising:

a capacitor;

first means for charging the capacitor;

second means for drawing electric energy from the capacitor and for charging the piezoelectric member with the electric energy drawn from the capacitor; and third means for discharging the piezoelectric member, wherein the second means includes a transformer having a primary winding connected to the capacitor and a secondary winding connected to the piezoelectric member, and wherein a capacitor "Cs" of the capacitor, a minimum value "Cpmin" of a capacitance of the piezoelectric element which occurs in a predetermined temperature range, and a ratio "1:n" between the number of turns of the primary winding and the number of turns of the secondary winding of the second means have a predetermined relation given as:

$$Cs/n^2 \leq Cpmin.$$

4. The apparatus of claim 3, wherein the third means includes means for transferring electric energy from the piezoelectric element to the capacitor.

5. The piezoelectric-element drive apparatus of claim 1, further comprising a clamping diode connected in parallel with the energy storing capacitor for preventing a voltage at a positive end of the energy storing capacitor from becoming negative.

6. A piezoelectric-element drive apparatus comprising:

a direct-current power supply;

an energy storing capacitor connected in parallel with the direct-current power supply;

an energy-transfer switching element which becomes on when energy is transferred from the energy storing capacitor;

a piezoelectric element connected in parallel with the energy storing capacitor, and receiving energy and expanding when the energy-transfer switching element becomes on;

a discharging coil connected in parallel with the piezoelectric element;

a discharging switching element for discharging the piezoelectric element via the discharging coil;

a coupling transformer provided between the energy storing capacitor and the piezoelectric element for transferring energy from the energy storing capacitor to the piezoelectric element; and a reverse-current blocking diode connected to the piezoelectric element and the coupling transformer, wherein the coupling transformer has a primary winding and a secondary winding, the primary winding being connected in series with the energy storing capacitor and the energy-transfer switching element, the secondary winding being connected in series with the piezoelectric element and the reverse-current blocking diode, and wherein a capacitor "Cs" of the energy storing capacitor, a minimum value "Cpmin" of a capacitance of the piezoelectric element which occurs in a predetermined temperature range, and a ratio "1:n" between the number of turns of the primary winding and the number of turns of the secondary winding of the coupling transformer have a predetermined relation given as:

$$Cs/n^2 \leq Cpmin.$$

\* \* \* \* \*